(12) United States Patent
Cohen

(10) Patent No.: US 10,116,222 B2
(45) Date of Patent: Oct. 30, 2018

(54) SOFT SWITCHING FLYBACK CONVERTER WITH PRIMARY CONTROL

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 70 days.

(21) Appl. No.: 15/007,262

(22) Filed: Jan. 27, 2016

(65) Prior Publication Data

US 2016/0233779 A1    Aug. 11, 2016

Related U.S. Application Data

(60) Provisional application No. 62/113,188, filed on Feb. 6, 2015.

(51) Int. Cl.
*H02M 3/335* (2006.01)
*H02M 1/00* (2006.01)

(52) U.S. Cl.
CPC .... *H02M 3/33592* (2013.01); *H02M 3/33507* (2013.01); *H02M 3/33576* (2013.01);
(Continued)

(58) Field of Classification Search
CPC ..... H02M 3/33592; H02M 2001/0058; H02M 3/33507; H02M 3/33576
See application file for complete search history.

(56) References Cited

U.S. PATENT DOCUMENTS

| 5,457,624 A | 10/1995 | Hastings |
| 5,768,118 A * | 6/1998 | Faulk ............... H02M 1/44 323/288 |

(Continued)

FOREIGN PATENT DOCUMENTS

EP    2757675 A2    7/2014

OTHER PUBLICATIONS

Zhang, et al., "A High Efficiency Flyback Converter With New Active Clamp Technique", IEEE Transactions on Power Electronics, vol. 25, No. 7, Jul. 2010, pp. 1775-1785.

(Continued)

*Primary Examiner* — Nguyen Tran
*Assistant Examiner* — Lakaisha Jackson
(74) *Attorney, Agent, or Firm* — Tuenlap D. Chan; Charles A. Brill; Frank D. Cimino

(57) ABSTRACT

Disclosed examples include synchronous rectifiers and flyback converters, integrated circuits and operating methods, in which a first switch is turned on to allow current to flow for a first time period in a first direction in a transformer primary winding responsive to a first switch voltage transitioning below a first threshold, and a second switch is turned on for a second time period after the first time period to transfer energy from a secondary transformer winding to drive a load. In the same converter cycle, the second switch is again turned on for a third time period in response to a second switch voltage transitioning below a second threshold at one of a series of troughs of a resonant ringing voltage waveform across the second switch, to cause current flow in a second direction in the primary winding to discharge a capacitance of the first switch to cause the first switch voltage to transition below the first threshold to initiate a subsequent converter cycle.

20 Claims, 5 Drawing Sheets

(52) U.S. Cl.
CPC .. *H02M 2001/0058* (2013.01); *Y02B 70/1433* (2013.01); *Y02B 70/1475* (2013.01); *Y02B 70/1491* (2013.01)

(56) References Cited

U.S. PATENT DOCUMENTS

| | | | |
|---|---|---|---|
| 6,441,598 | B1 | 8/2002 | Ivanov |
| 6,594,161 | B2 * | 7/2003 | Jansen .............. H02M 3/33592 363/21.13 |
| 6,686,729 | B1 | 2/2004 | Kawamura et al. |
| 6,861,826 | B2 | 3/2005 | Lynch |
| 8,963,529 | B2 | 2/2015 | Cohen |
| 8,964,420 | B2 | 2/2015 | Zhang |
| 2002/0141209 | A1 | 10/2002 | Bridge |
| 2004/0070378 | A1 | 4/2004 | Baldwin et al. |
| 2007/0242487 | A1 * | 10/2007 | Orr ....................... H02M 3/335 363/21.12 |
| 2008/0298106 | A1 | 12/2008 | Tateishi |
| 2010/0027298 | A1 | 2/2010 | Cohen |
| 2010/0195254 | A1 | 8/2010 | Cohen et al. |
| 2010/0315840 | A1 | 12/2010 | Cohen |
| 2011/0090725 | A1 | 4/2011 | Lu |
| 2011/0205764 | A1 | 8/2011 | Sheng et al. |
| 2012/0081928 | A1 | 4/2012 | Roessler et al. |
| 2012/0275198 | A1 | 11/2012 | Cohen |
| 2013/0077356 | A1 | 3/2013 | Cohen |
| 2013/0148385 | A1 | 6/2013 | Zhang |
| 2013/0272036 | A1 * | 10/2013 | Fang ................. H02M 3/33507 363/21.17 |
| 2014/0003096 | A1 | 1/2014 | Deng |
| 2014/0218976 | A1 * | 8/2014 | Luo ................... H02M 3/33507 363/21.01 |
| 2015/0092454 | A1 | 4/2015 | Cohen |
| 2015/0103563 | A1 | 4/2015 | Wang |
| 2015/0214846 | A1 | 7/2015 | Cohen |
| 2016/0094137 | A1 * | 3/2016 | Jitaru ................. H02M 3/3353 363/21.03 |

OTHER PUBLICATIONS

Search Report for PCT Application No. PCT/US16/17006, dated Jun. 30, 2016 (1 page).

* cited by examiner

SOFT SWITCHING FLYBACK CONVERTER WITH PRIMARY CONTROL

REFERENCE TO RELATED APPLICATION

Under 35 U.S.C. § 119, this application claims priority to, and the benefit of, U.S. provisional patent application No. 62/113,188, entitled "SOFT SWITCHING FLYBACK CONVERTER WITH PRIMARY CONTROL", filed on Feb. 6, 2015, the entirety of which application is hereby incorporated by reference.

TECHNICAL FIELD

The present disclosure relates generally to flyback converters, and more particularly to soft switching and synchronously rectified flyback converters.

BACKGROUND

Synchronous rectifiers are used to perform DC-DC conversion in order to drive an output load, where a transformer is often used to construct a flyback converter with a secondary side switch to provide efficiency advantages over passive rectified flyback converters. In many applications, efficiency is a primary design goal, and it is desirable to reduce or mitigate switching losses as well as conduction losses in the primary and secondary side switches. Soft switching or zero voltage switching (ZVS) involves turning the primary and/or secondary side switches on when the voltage across the switch is low (preferably zero). Ideally, switching at zero volts minimizes switching loss, but this is difficult due to drain-source capacitance of field effect transistor (FET) type switches. Conduction loss occurs while the switch is turned on, and can be reduced by using larger switches, thereby reducing the on-state resistance (e.g., drain-source resistance RDSON for FET switches). However, larger transistor dimensions leads to increase in the switch capacitance, and thus simply increasing transistor size to mitigate conduction losses increases the switching losses, absent soft switching control. Furthermore, the ability to perform simple soft switching on the primary side switch of a synchronously rectified flyback converter is difficult over a wide range of input voltage and output voltage/current conditions. Certain conventional transition mode (TM) synchronous rectifier control schemes use valley control to regulate a converter output current or voltage, and the primary side switch is turned on at a local minima or "trough" of the resonant voltage ring at the primary side switching node. However, the resonant voltage oscillations do not approach zero volts even at the troughs, particularly for high input voltage conditions. Thus, true zero voltage switching cannot be achieved across a wide range of operating conditions for conventional synchronously rectified flyback converters, and switching losses can be substantial. At certain operating conditions, therefore, discontinuous mode (DM) switching operation must be used, which increases conduction losses and therefore reduces the converter efficiency. Moreover, hard switching (i.e., the inability to reliably achieve true zero voltage switching) inhibits the ability to increase switch size for combating conduction losses, and leads to increased common mode electromagnetic interference (EMI). Hard turn on of the primary side switch can also cause resonant doubling of the voltage on the secondary side rectifier, leading to increased synchronous rectifier blocking voltage as well as further increase to conduction losses caused by higher RDSON. Improved synchronous rectifier flyback converters and control techniques are therefore desirable to mitigate capacitive switching losses to support increased power density and switching frequency without degraded efficiency.

SUMMARY

Example synchronous rectified flyback converters, integrated circuits and operating methods are disclosed. A primary side first switch is turned on in response to its switch voltage transitioning below a first threshold to allow current to flow in a transformer primary winding for a first time period in a first direction. The first switch is turned off, and a secondary side switch is turned on for a second time period to transfer energy from the transformer secondary to drive a load. The second switch is again turned on in the same converter cycle for a third time period in response to a second switch voltage transitioning below a second threshold at one of a series of troughs of a resonant ringing voltage waveform across the second switch. Turning off the second switch causes current to flow in a second direction in the primary winding to discharge the first switch capacitance to cause the first switch voltage to transition below the first threshold to initiate a subsequent converter cycle. These techniques and circuitry facilitate reduction in switching losses, while allowing use of larger switch sizes to combat conduction loss, and converter operating switching frequency can therefore be increased. Transformer leakage can be mitigated in certain examples by use of a two-switch flyback topology to return leakage energy to the input rather than dissipating it in the clamp. In certain examples, the second actuation of the second switch is undertaken at or near a particular trough in a series of resonant ringing peaks and troughs of the second switch voltage. In certain examples, moreover, a control circuit selects a particular one of the troughs at which to again turn on the second switch for the third time period at least partially according to a converter output signal. The trough selection on the secondary side control is used to implement frequency modulation to regulate the converter output in certain examples, to provide secondary side regulation. In certain examples, primary side regulation is used.

DETAILED DESCRIPTION

Figure 1:
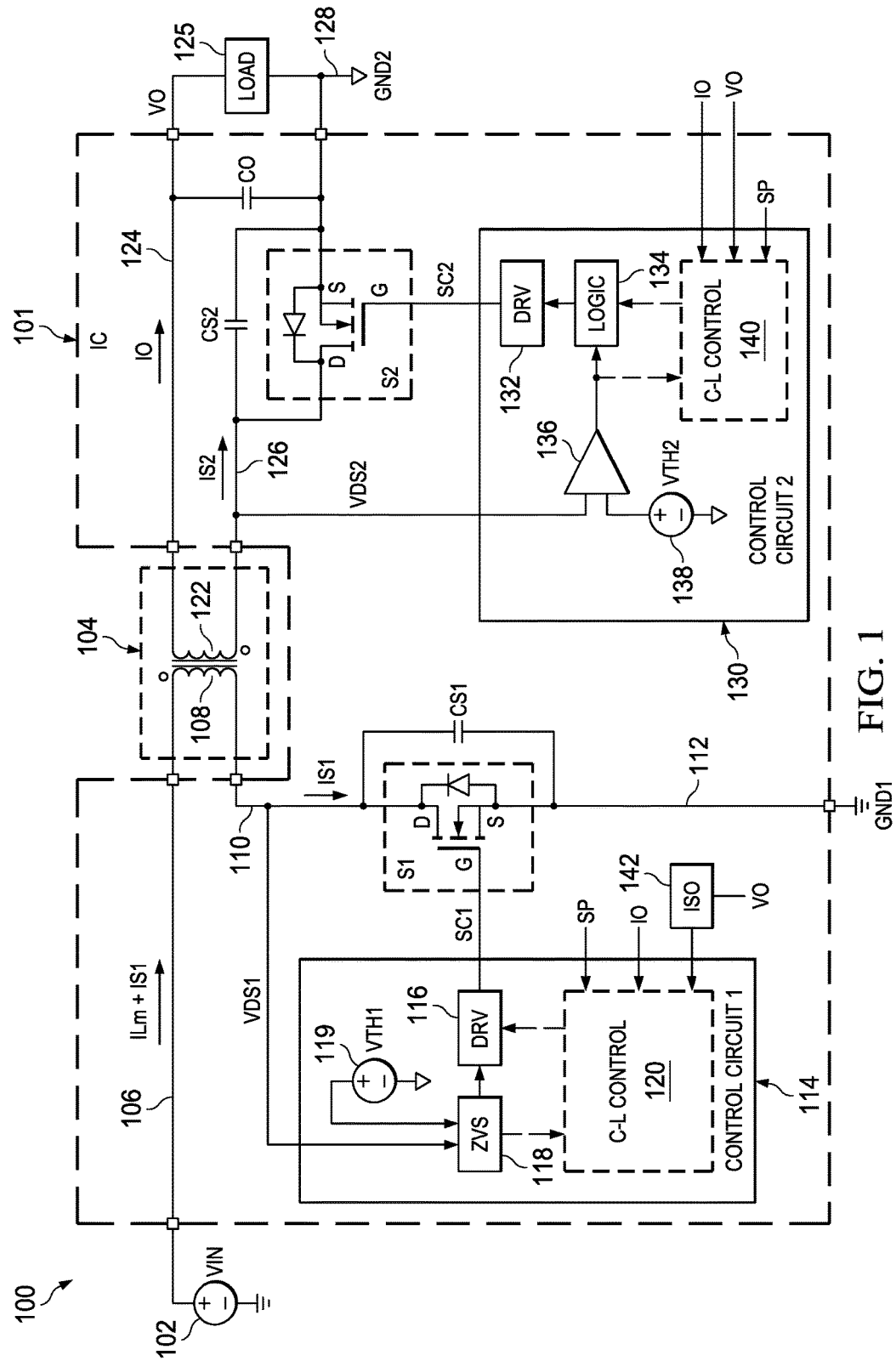
FIG. 1 is a schematic diagram of a synchronously rectified flyback converter with a first switch coupled with a transformer primary winding and operated by a first control circuit, as well as a second switch coupled between a transformer secondary winding and an output load for operation according to control signals from a second control circuit to implement multiple secondary side switch actuations in a given converter cycle.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ." Also, the term "couple" or "couples" is intended to include indirect or direct electrical connection or combinations thereof. For example, if a first device couples to or is coupled with a second device, that connection may be through a direct electrical connection, or through an indirect electrical connection via one or more intervening devices and connections.

FIG. 1 shows a synchronously rectified flyback converter system 100, including a transformer 104, a primary side or first switch S1, and a secondary side or second switch S2 to convert input power from a DC voltage source 102 to drive a load 125. The first switch S1 is operated by a first switching control signal SC1 provided by a first control circuit 114, and the second switch S2 is operated according to a second switching control signal SC2 from a second control circuit 130. In one example, the switches S1 and S2 and the control circuits 114 and 130 are provided in an integrated circuit (IC) 101 with terminals or pins or other suitable connections for receiving an input voltage VIN from an external DC source 102, one or more ground connections, connections to an external transformer 104, and to provide an output voltage VO to an external load 125. In other examples, the transformer 104 can be included within the IC 101. In other examples, a controller IC 101 can be used, with suitable pins for connection to control external first and second switches S1 and S2. The illustrated examples include N-channel field effect transistor (FET) switches S1 and S2. Other types of switches can be used, including without limitation P-channel FETs, bipolar transistors (P or N-type), insulated gate bipolar transistors (IGBTs), or the like, or combinations thereof, with the respective control circuits 114 and 130 providing suitable switching control signals SC1 and SC2 in order to actuate the switches S1 and S2 according to the principles of the present disclosure.

The transformer 104 includes a primary winding 108 and a secondary winding 122, which are magnetically coupled with one another, for example, by being wound at least partially around a common core structure (not shown). The primary winding 108 includes a first end 106 to receive the input voltage signal VIN, and a second end 110 connected to the first switch S1. The first switch S1 is coupled between the second end 110 of the primary winding 108 and a first ground connection or constant voltage node 112 (labeled GND1 in the drawing). The switch S1 includes a first terminal (e.g., a drain D) coupled with the second end 110 of the primary winding 108, a second terminal (e.g., a source S) coupled with the first constant voltage node 112, and a first control terminal (e.g., gate G) to receive the first switching control signal SC1. As also shown in FIG. 1, the switch S1 includes a body diode having an anode connected to the source terminal, and a cathode connected to the drain terminal, as well as a drain-source switch capacitance schematically shown as a first switch capacitance CS1.

In operation, the first switch S1 is placed in an on state or condition to selectively allow a first switch current IS1 to flow between the first and second terminals D, S when the first switching control signal SC1 is in a first state (e.g., HIGH for an N-channel FET S1). In this condition, a current ILm+IS1 flows from the input source 102 into the first end 106, including the current IS1 flowing through the first switch S1, and current ILm associated with a magnetizing inductance Lm of the primary winding 108. When the first switching control signal SC1 is in a different second state (e.g., LOW), the first switch S1 is in an off state or condition that prevents current flow between the first and second terminals D and S.

The secondary winding 122 of the transformer 104 includes a first end 124 to provide an output voltage signal VO to drive the load 125, and a second end 126 coupled with the second switch S2. The switch S2 includes a first terminal (e.g., drain D) coupled with the second end 126 of the secondary winding 122, and a second terminal (e.g., source S) coupled with a second constant voltage node 128, labeled GND2. In addition, the switch S2 includes a second control terminal (e.g., gate G) coupled to receive the second switching control signal SC2 from the second control circuit 130. As further shown in FIG. 1, the second switch S2 includes a body diode and a second switch capacitance shown as CS2. The second switch S2 operates in an on state or condition to allow a second switch current IS2 to flow between its source and drain terminals D and S (e.g., between the second end 126 of the winding 122 and the second constant voltage node 128) when the second switching control signal SC2 is in a first state (e.g., HIGH for a P-channel FET S2). In this configuration, output current IO flows between the first end 124 of the secondary winding 122 and the output load 125. S2 operates in an off state or condition to prevent current flow between its source and drain terminals D and S when the signal SC2 is in a different second state (e.g., LOW). Although the illustrated example includes the secondary side switch S2 in the lower circuit branch between the lower end 126 of the secondary winding 122 and the second constant voltage node GND2, other examples are possible in which the secondary side switch S2 is connected between the upper end 124 and the load 125, with the lower secondary winding end 126 coupled with GND2.

In operation, when the first and second switches S1 and S2 are turned off, a resonant isolation or ringing occurs in the second switch voltage of S2 (e.g., drain-source voltage VDS2 relative to GND2) due to the charge transfer between the switch capacitance CS2, the inductance of the secondary winding 122, and capacitance of an output capacitor CO connected across the output terminals. This resonant ringing condition results in peaks and troughs in the voltage VDS2, where the troughs generally reach zero volts. Also, resonant ringing occurs in this switching condition in the voltage VDS1 across the primary side first switch S1, where the associated resonant peaks generally reach the input voltage level VIN, and the troughs generally do not reach zero. Turning the first switch S1 on to begin a converter cycle at the troughs of the first switch voltage VDS1 can slightly reduce hard switching losses in S1, but this technique cannot provide a complete solution to switching loss problems, and the situation worsens with increased input voltage levels.

Figure 2:
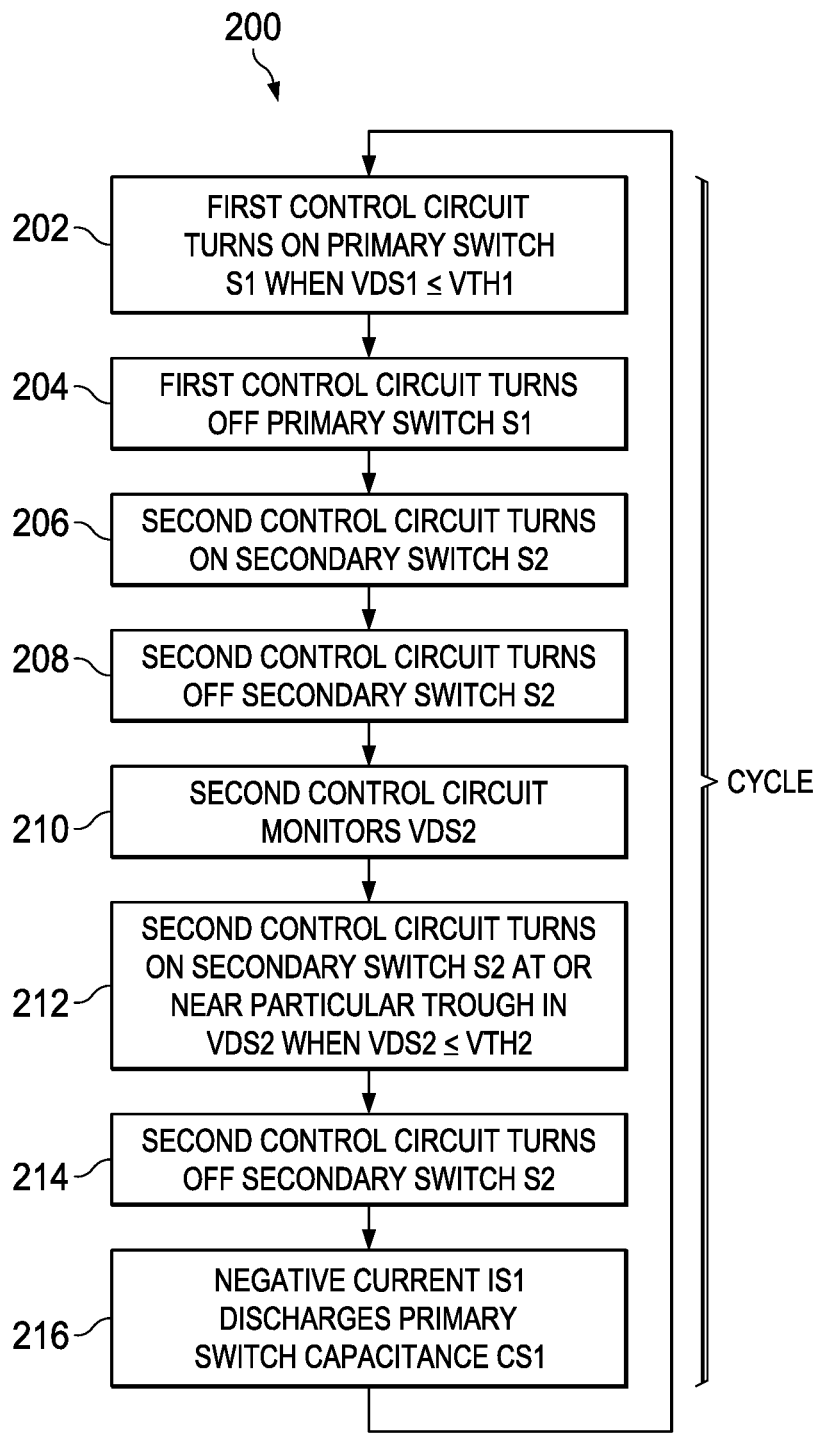
FIG. 2 is a flow diagram illustrating a method of operating a synchronously rectified flyback converter.
Figure 3:
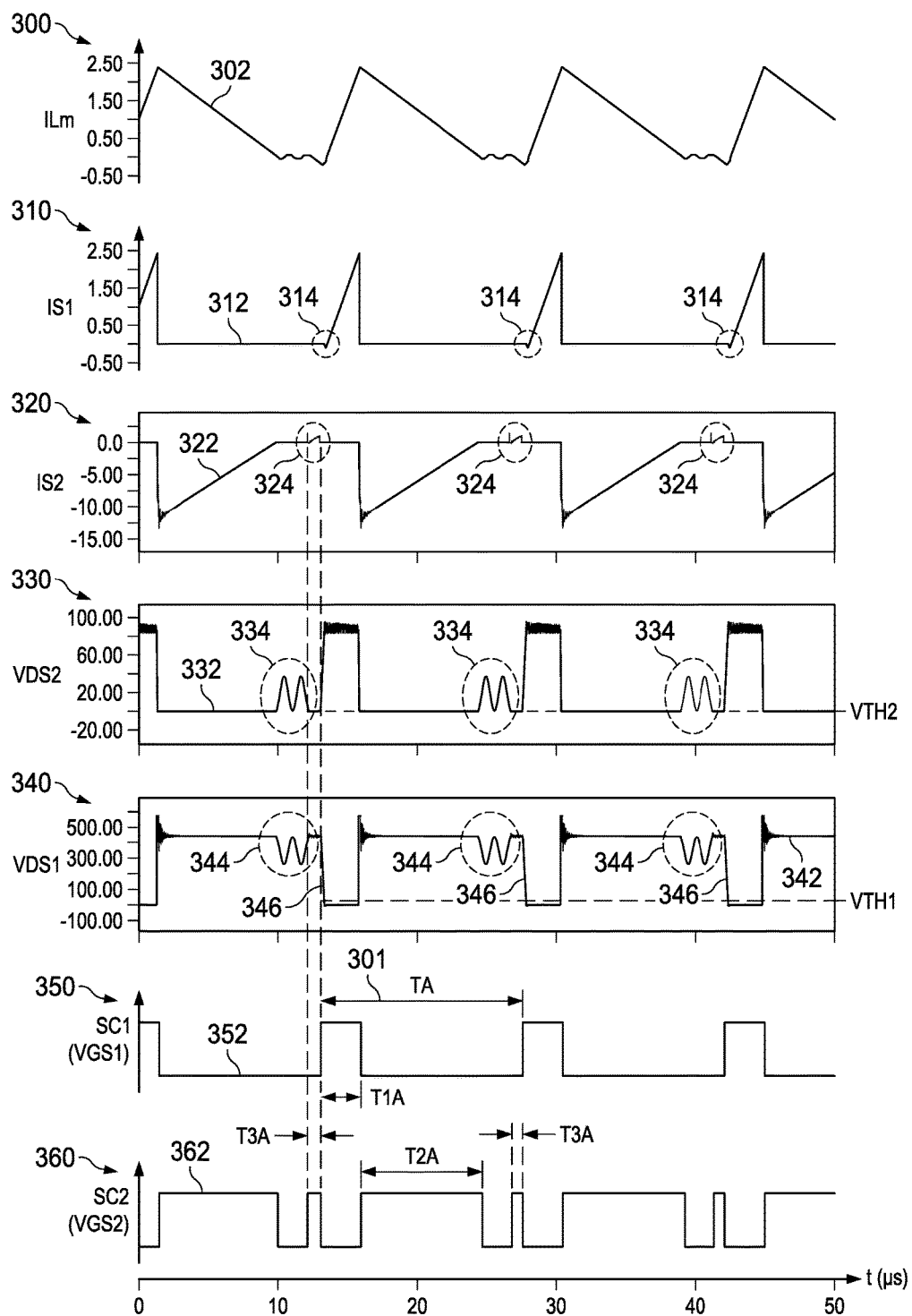
FIG. 3 is a waveform diagram of signals in the converter of FIG. 1 in which the secondary site switch is pulsed a second time in a given converter cycle at or near a second resonant trough of the second switch voltage.
Figure 4:
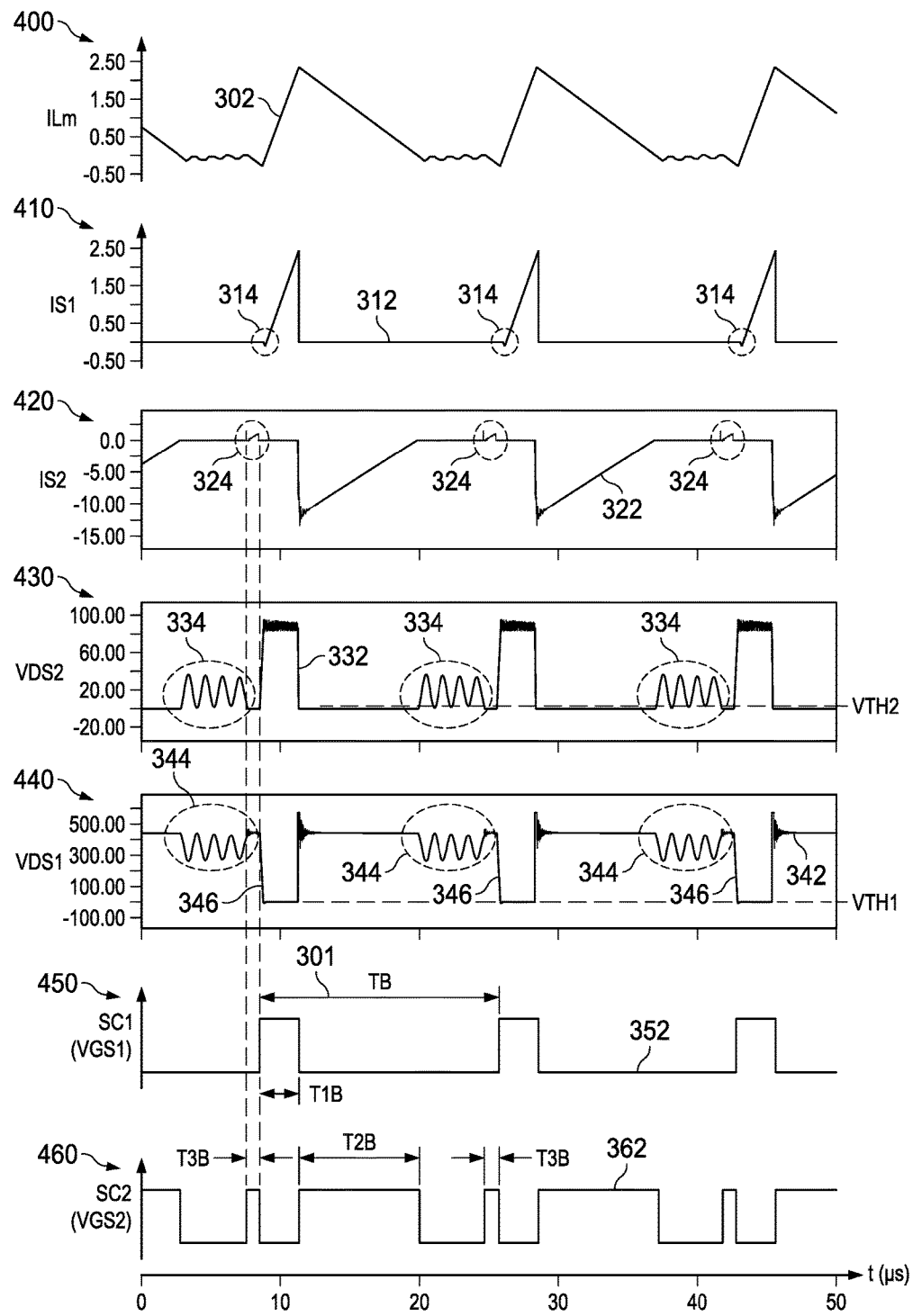
FIG. 4 is a waveform diagram of signals in the converter of FIG. 1, in which the secondary side switch is pulsed a second time in a given converter cycle at or near a fourth resonant trough of the second switch voltage.

Referring also to FIGS. 2-4, the first and second control circuits 114 and 130 in the disclosed examples advantageously provide for controlled discharging of the first switch capacitance CS1 (and also the second switch capacitance CS2) by advanced switching control in which the second switch S2 is turned on prior to initiation of the primary side switching. FIG. 2 shows a process or method 200 for operating a synchronous rectifier, such as the flyback converter 100 of FIG. 1. The process 200 is described below in connection with operation of the first and second control circuits 114 and 130 in the IC 101 of FIG. 1. However, the methods of the present disclosure can be used in other synchronous rectifier circuit configurations.

FIG. 3 illustrates example signal waveforms in the converter of FIG. 1, in which the secondary side switch S2 is pulsed a second time in a given converter cycle at or near a second resonant trough (e.g., local minima) of the second switch voltage VDS2. FIG. 4 shows an example where S2 is pulsed a second time at or near a fourth resonant trough in VDS2. The waveform diagrams include a graph 300 in FIG. 3 and a graph 400 in FIG. 4 showing magnetizing current curves 302 (Ihm) representing the current associated with the magnetizing inductance Lm of the primary winding 108, as well as graphs 310 (FIG. 3) and 410 (FIG. 4) illustrating the first switch current curves 312 (IS1) flowing in the first switch S1. FIGS. 3 and 4 further provide graphs 320 and 420 respectively illustrating current curves 322 (IS2) flowing through the second switch S2. Graphs 330 and 430 in FIGS. 3 and 4 respectively show second switch voltage curves 332 (VDS2) representing the drain-source voltage across the second switch S2, and graphs 340 and 440 respectively illustrate first switch voltage curves 342 (VDS1) representing the voltage across S1. In addition, graphs 350 and 450 illustrate first switching control signal curves 352 representing the gate-source control voltages VGS1 provided by the first control circuit 114 to operate S1 (e.g., switching control signal SC1). The graphs 360 and 460 in FIGS. 3 and 4 respectively show the second switching control signal curves 362 for the gate-source voltage VGS2 representing the second switching control signal SC2 provided by the second control circuit 130 to operate S2.

FIG. 2 shows the converter operation for a given one of a series of converter cycles. The process 200 begins at 202, where the first control circuit 114 provides the first switching control signal SC1 (high going transition in the curve 352 in graphs 350 and 450 in FIGS. 3 and 4) to turn on S1 for a non-zero first time period shown as period T1 in an example converter cycle 301 in FIGS. 3 and 4. Turning on S1 allows current IS1 to flow in a first (e.g., downward) direction in the primary winding 108, indicated by the rising current flow in the ILm and IS1 curves 302 and 312 in FIGS. 3 and 4. The first control circuit 114 turns on S1 in response to the first switch voltage VDS1 transitioning below a first threshold VTH1, shown in the graphs 340 and 440 of FIGS. 3 and 4, respectively. Ideally, the first control circuit 114 turns on S1 when the voltage VDS1 is at or near zero, and thus a small threshold voltage VTH1 facilitates zero voltage or near-zero voltage switching. The VDS1 curve 342 includes a falling edge 346 indicating the transition in VDS1 below the threshold VTH1 at the beginning of the first time period T1A (FIG. 3). The second control circuit 130 turns off S2 via a rising edge in the SC2 control signal (curve 362), and the corresponding second switch voltage VDS2 oscillates around the output voltage level VO (curve 332) during the first time period T1A.

As shown in FIG. 1, the first control circuit 114 in one example includes a zero voltage switching (ZVS) circuit 118, which can include a comparator or other suitable circuitry to compare the switch node voltage VDS1 with a first threshold voltage VTH1 from a voltage source 119. As schematically illustrated, the ZVS circuit 118 provides a signal to a first driver circuit 116, which in turn provides the first switching control signal SC1 to the gate control terminal of S1. In one example, in response to the sensed VDS1 signal transitioning below the VTH1 signal, the driver circuit 116 brings the SC1 signal high in order to turn on the switch S1.

In certain examples, the first control circuit 114 also includes a closed-loop (C-L) control circuitry 120 which controls the first time period or duration T1 (T1A in FIG. 3, T1B in FIG. 4) during which the first switch S1 remains in the on state, based in whole or in part on a desired output level represented by a setpoint signal SP (e.g., a desired output current, voltage, power, etc.). The closed-loop control circuit 120 in one example can include one or more error amplifiers (not shown) generating an error signal to set the on-time T1 for S1 based on comparison of the setpoint signal SP with one or more feedback signals or values, such as the output current IO, the output voltage VO, etc. Where such primary-side regulation is implemented by the first control circuit 114, moreover, the IC 101 may include one or more isolation circuits 142, for example, to provide an isolated feedback signal to the first control circuit 114 (relative to GND1) based on a signal sensed on the secondary side of the transformer 104 (relative to GND2). The first control circuit 114 determines the first time period T1 according to such closed-loop control circuitry 120 in one example. In other examples, the first control circuit 114 implements a constant on time (COT) control scheme, where T1 is a generally constant value.

At 204 in FIG. 2, the first control circuit 114 turns off the switch S1. This causes the first switch voltage VDS1 to rise and oscillate for a time around the input voltage level VIN, shown in curve 342 in FIG. 3. This action reduces the first switch current IS1 to zero as shown in the curve 312.

At 206 in FIG. 2, the second control circuit 130 turns on the secondary switch S2, causing the magnetizing inductance current Ihm to begin ramping down as shown in the curve 302, and the second switch current IS2 starts to ramp down toward zero as shown in the curve 322. In one example, the second control circuit 130 includes a second driver circuit 132 which provides a high gate control signal SC2 in order to turn on the switch S2 at 206 in FIG. 2. The control circuit 130 maintains the switch S2 in the initial on state for a non-zero second time period T2 following the first time period T1 in the converter cycle 301, shown as T2A in FIG. 3 and T2B in FIG. 4. The second time period or duration T2 can be a constant time in certain control schemes, for example, where the first control circuit 114 regulates the output condition of the converter 100 by adjusting the on-time T1 of the first or primary side switch S1. In other examples, the second control circuit 130 can adjust the second time period T2 according to one or more output conditions in order to provide closed-loop regulation.

The second control circuit 130 turns the second switch S2 off at 208 in FIG. 2 at the end of the second time period T2. This ends the ramp down in the second switch current IS2, which levels off at zero. Turning off S2 causes resonant oscillation in the second switch voltage VDS2, shown in the indicated regions 334 and the curve 332 through operation of a resonant circuit formed by the inductance of the secondary winding 122 and the capacitances CS2 and CO on the secondary side of the converter 100. Turning off S2 while S1 remains off also causes corresponding resonant voltage swings in the primary side switch voltage VDS1 based on the capacitance CS1 and the primary winding inductance, shown as peaks and troughs in the curve 342 in the circled regions 344 in FIG. 3. The trough of the resonant ring touches zero for any combination of converter input and output conditions (e.g., independent of VIN, VO, IO).

As seen in FIG. 1, one example of the second control circuit 130 includes a logic circuit 134, a comparator or error amplifier 136, and a second threshold voltage source 138 providing a second threshold voltage signal VTH2 as an input to the comparator 136. The other comparator input in this example is connected to receive a secondary-side switching node signal representing the second switch voltage VDS2. The comparator 136 provides an output signal to the logic circuit 134. The logic circuit 130 in one example operates to provide first and second pulse signals SC2 to turn the second switch S2 on and off twice in each converter cycle 301. In addition, the control circuit 130 in certain examples also includes closed-loop (C-L) control circuitry 140. The closed-loop control circuitry 140 receives the output signal of the comparator 136 and provides one or more signals to the logic circuit 134 in order to implement a closed-loop regulation scheme to regulate one or more output conditions of the converter 100 based on a setpoint signal or value SP and one or more feedback signals or values (e.g., IO, VO, etc.).

At 210 in FIG. 2, the second control circuit 130 monitors the resonantly oscillating second switch voltage VDS2 (e.g., via the comparator 136). At 212, the second control circuit 130 again turns on S2 at 212 (the second actuation of S2 in a given converter cycle) at or near a particular trough in VDS2 in response to VDS2 transitioning to or below the second threshold VTH2. The second control circuit 140 maintains the second switch S2 in the on state for a non-zero third time period T3 in the converter cycle, shown as T3A in FIG. 3 and T3B in FIG. 4, and turns off S2 at 214 in FIG. 2. This second or supplemental actuation of S2 in a given converter cycle provides a slight reverse direction secondary side current flow IS2 indicated in the circled regions 324 and the curve 322, resulting in full or at least partial discharging of the second switch capacitance CS2. Turning S2 on also causes current flow IS1 in the primary winding 108 in a second direction (e.g., upward in FIG. 1), shown as negative current transitions in the circled regions 314 in the curve 312. The reversed primary side current flow IS1 fully or at least partially discharges the first switch capacitance CS1. The secondary-side initiated discharging of the CS1, in turn, decreases the first switch voltage VDS1 below the first threshold VTH1 at 216 in FIG. 2, and thus causes the first control circuit 114 to initiate the next or subsequent converter cycle 301.

The duration T3 during which the second switch S2 remains in the on state can be adjusted by the second control circuit 130 in certain examples. In one implementation, the second control circuit 130 monitors VDS2 to detect a certain amount of discharge of CS2 in order to determine when S2 is again to be turned off, thereby selectively adjusting the third time period T3. In other examples, T3 is a predetermined duration implemented by the second control circuit 130, and set to a value suitable to ensure sufficient discharge of the primary-side first switch capacitance CS1 in order to trigger the beginning of a subsequent converter cycle by the first control circuit 114.

The second control circuit 130 in certain examples provides the second signal SC2 to turn on the second switch S2 for the third time period T3 in response to the second switch voltage VDS2 transitioning below the second threshold VTH2 at or near a particular one of the troughs. For instance, the logic circuit 134 and/or the closed-loop control circuit 140 can be configured to select a given trough in the second switch voltage waveform resonant oscillations (e.g., curve 332 in graphs 330 and 430 of FIGS. 3 and 4) at which the driver circuit 132 will be triggered. FIG. 3 shows one example in which the second control circuit 130 uses the comparator 136 to monitor the peaks and troughs of the resonant ringing 334 in the VDS2 signal waveform 332. The logic circuit 134 can include a counter or other suitable circuitry to select a particular trough at which the switch S2 is turned on. In one example, the second control circuit 130 turns off the second switch S2 at 214 in FIG. 2 after a predetermined or fixed third time period T3 based on a predetermined number of rings in the voltage VDS2.

Comparing FIGS. 3 and 4, the second control circuit implements closed loop control using the circuitry 140 to selectively adjust the number of troughs in VDS2 before S2 is turned on according to one or more feedback signals or values. This approach modifies the overall converter control cycle or period T (e.g., TA in FIG. 3, TB in FIG. 4) and this changes the switching frequency (1/T) to implement frequency modulated (FM) output regulation for the converter 100. As shown in FIGS. 3 and 4, for instance, initiating the second switching of S2 at the second trough (FIG. 3) provides a first converter cycle duration TA, and waiting until the fourth trough to turn on S2 (FIG. 4) provides a longer converter cycle duration TB, thus decreasing the switching frequency. In certain examples, the second control circuit 130 selects the particular trough at which to again turn on S2 at least partially according to a converter output signal VO, IO. This control capability can be used to provide secondary-side regulation of one or more converter output signals, such as the output voltage VO, the output current IO, output power, or the like. For example, the second control circuit 130 can select the particular trough at which to again turn on S2 and thus set the converter cycle duration T in order to selectively adjust the converter switching frequency and the corresponding converter cycle duration T of the converter cycle 301 to at least partially regulate the converter output signal according to the setpoint signal SP. The second control circuit 130 in one example directly senses one or more converter output signals (e.g., VO and/or IO). In certain examples, the second control circuit 130 computes the converter output signal or signals according to one or more sensed conditions (e.g., VDS2, IS2, etc.) on the secondary side of the transformer 104.

Using the above techniques, disclosed examples provide control of converter power transfer using a variety of different approaches, including magnetizing current amplitude modulation (AM) via primary-side regulation in the first control circuit 114. In another example, frequency modulation (FM) can be performed using primary or secondary-side regulation, in which the switching frequency may be reduced from its natural maximum (e.g., which occurs at Transition Mode) to lower values by starting a new switching cycle at a later trough of the voltage VDS2. Moreover, the use of the supplemental or auxiliary actuation of S2 in each converter cycle provides enhanced mitigation or elimination of switching losses, and thus facilitates reduction of the frequency modulation adjustment range needed to effectively reduce the converter efficiency compared with conventionally controlled flyback converters. The described examples also facilitate soft switching in both converter switches S1 and S2, and recovery of the energy in the switching node capacitances CS1 and CS2. In this manner, the efficiency benefits of synchronous rectification are supplemented with reduced conduction loss in the clamp switch S1 and the transformer primary 108 without addition of any new components, while allowing AM and FM modulation for primary or secondary-side regulation of the output conditions, and high efficiency even at high switching frequencies.

Also, the ability to achieve true or near ZVS switching at any input/output voltages and load combination facilitates maintaining transition mode (TM) operation at much lower output loads than for a conventional flyback converter. This facilitates higher converter efficiency, lower acoustical noise and higher sampling frequency at light load conditions. The amplitude of the resonant ring decays with time, and eventually, the drain voltage of S1 settles at VIN and the drain voltage of S2 settles at the output voltage level VO. Turning on S2 at this point in order to initiate the conduction of S1 significantly lowers the energy loss due to the forcible charge of the drain to common capacitances CS1 and CS2 compared with a conventional quasi-resonant converter turning on at the same point because the voltage change on the capacitors is considerably larger in the conventional case. Moreover, recycling of the energy stored in the capacitances CS1 and CS2 by the second actuation of S2 in the converter cycle facilitates oversizing S1 and/or S2 to reduce conduction losses without the penalty of increased loss due to the charging/discharging of these capacitances. Oversizing S1, in turn, improves the self-snubbing when S1 is turned off, thereby reducing the turn off switching loss, and soft switching when S1 is turned on reduces common mode EMI.

Figure 5:
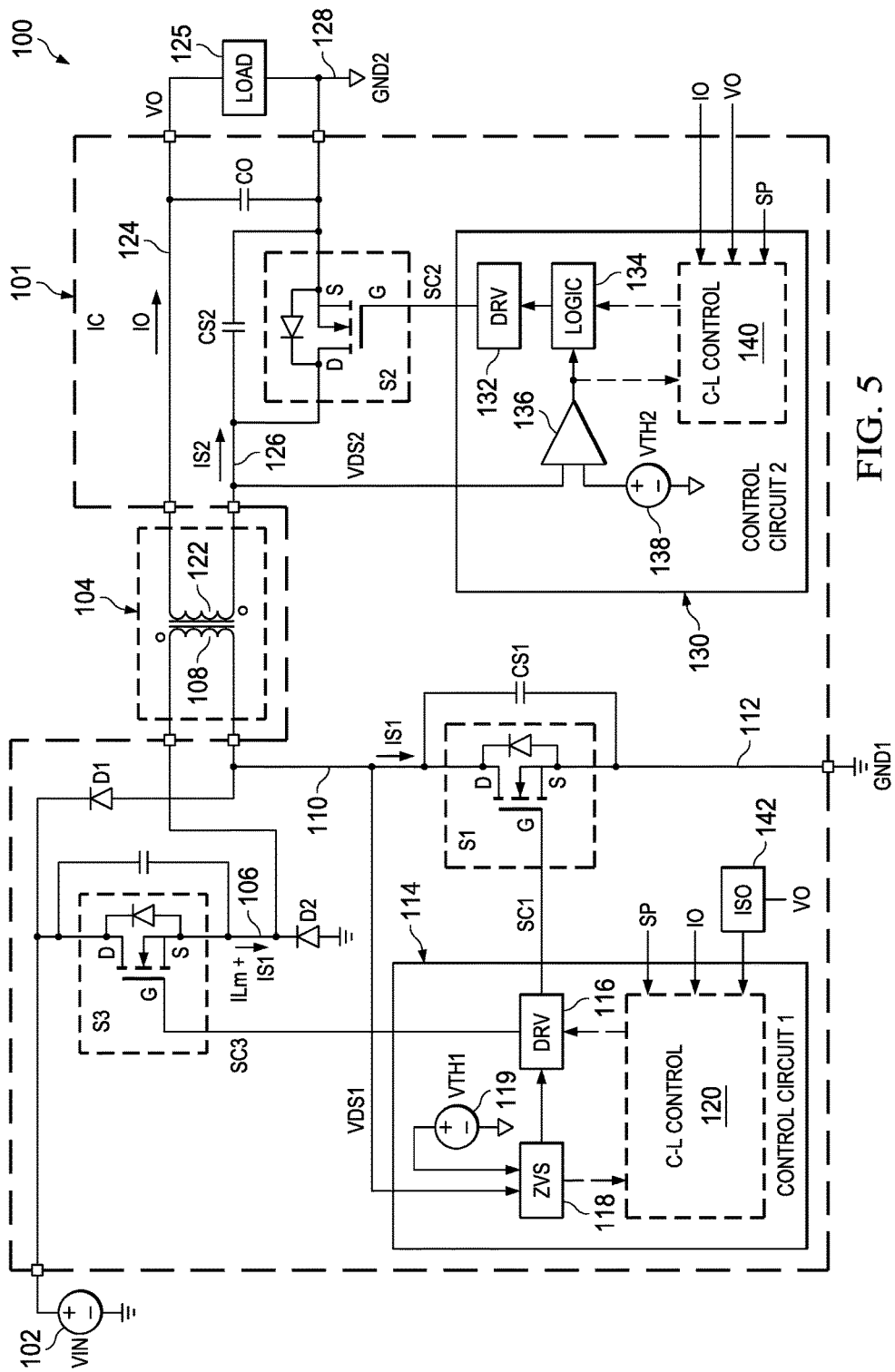
FIG. 5 is a schematic diagram of a second example synchronously rectified flyback converter with first and second primary side switches.

Referring now to FIG. 5, disclosed examples also facilitate recovery of transformer leakage energy, and thus allow significant increase of the switching frequency. This loss can be reduced by using a two-switch flyback topology to return the leakage to the input instead of dissipating it in the clamp. FIG. 5 shows a second example synchronously rectified flyback converter 100 using this two-switch flyback approach. The converter 100 in FIG. 5 includes first and second primary side switches S1 and S3, in addition to the secondary switch S2. In this example, S1 and S2 operate according to signals SC1 and SC2 from the first and second control circuits 114 and 130 as generally described above. The third switch S3 includes a first terminal (e.g., drain D) coupled to receive the input voltage signal VIN, a second terminal (e.g., source S) coupled with the first end 106 of the primary winding 108, and a third control terminal (e.g., gate G) coupled to receive a third switching control signal SC3 from the first control circuit 114. In one example, the driver circuit 116 of the first control circuit 116 provides the first and third simultaneous or concurrent switching control signals SC1 and SC3 in unison. In this manner, the first control circuit 114 provides the third switching control signal SC3 to turn on S3 when S1 is also on, and to turn off S3 when the first switch S1 turns off. A first diode D1 is coupled between the second end 110 of the primary winding 108 and the input voltage VIN, and a second diode D2 is coupled between the first end 106 of the primary winding 108 and the first constant voltage node 112 (GND1), so diodes D1 and D2 clamp the primary winding 108 to the input voltage 102, thereby allowing recovery of the leakage energy.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

The following is claimed:

1. A flyback converter, comprising:
a transformer, including:
a primary winding, including a first end to receive an input voltage signal, and a second end, and
a secondary winding, including a first end to provide an output voltage signal, and a second end;
a first switch, including a first terminal coupled with the second end of the primary winding, a second terminal coupled with a first constant voltage node, and a first control terminal to receive a first switching control signal;
a second switch, including a first terminal coupled with the second end of the secondary winding, a second terminal coupled with a second constant voltage node, and a second control terminal to receive a second switching control signal;
a first control circuit to provide the first switching control signal to turn on the first switch for a non-zero first time period in a converter cycle to allow current to flow in a first direction in the primary winding in response to a first switch voltage across the first switch transitioning below a first threshold; and
a second control circuit to provide the second switching control signal to turn on the second switch for a non-zero second time period following the first time period in the converter cycle, the second control circuit operative to provide the second switching control signal to again turn on the second switch for a non-zero third time period in the converter cycle in response to a second switch voltage across the second switch transitioning below a second threshold to cause current flow in a second direction in the primary winding to at least partially discharge a capacitance of the first switch to cause the first switch voltage to transition below the first threshold to initiate a subsequent converter cycle and allow the first switch to operate at or near a zero-voltage switching (ZVS) condition.

2. The flyback converter of claim 1, wherein the second switch voltage undergoes resonant ringing including a series of peaks and troughs while the second switch is off; and wherein the second control circuit is operative to provide the second switching control signal to turn on the second switch for the third time period in response to the second switch voltage transitioning below the second threshold at or near a particular one of the troughs.

3. The flyback converter of claim 2, wherein the second control circuit selects the particular one of the troughs at which to again turn on the second switch for the third time period at least partially according to a converter output signal.

4. The flyback converter of claim 3, wherein the second control circuit selects the particular one of the troughs at which to again turn on the second switch for the third time period to selectively adjust a switching frequency and a duration of the converter cycle to at least partially regulate the converter output signal according to a setpoint signal.

5. The flyback converter of claim 4, wherein the second control circuit directly senses the converter output signal.

6. The flyback converter of claim 4, wherein the second control circuit computes the converter output signal according to one or more sensed conditions on the secondary side of the transformer.

7. The flyback converter of claim 1, wherein the first control circuit selectively adjusts the first time period to regulate a converter output signal.

8. The flyback converter of claim 1, comprising:
a third switch, including a first terminal coupled to receive the input voltage signal, a second terminal coupled with the first end of the primary winding, and a third control terminal to receive a third switching control signal;

a first diode, including a first anode connected to the second end of the primary winding, and a first cathode connected to the first terminal of the third switch; and a second diode, including a second anode connected to the first constant voltage node, and a second cathode connected to the first end of the primary winding;

wherein the first control circuit is operative to provide the third switching control signal to turn on the third switch when the first switch is on, and to turn off the third switch when the first switch is off.

9. The flyback converter of claim 8, wherein the second switch voltage undergoes resonant ringing including a series of peaks and troughs while the second switch is off; and wherein the second control circuit is operative to provide the second switching control signal to turn on the second switch for the third time period in response to the second switch voltage across the second switch transitioning below the second threshold at or near a particular one of the troughs.

10. The flyback converter of claim 9, wherein the second control circuit selects the particular one of the plurality of troughs at which to again turn on the second switch for the third time period at least partially according to a converter output signal.

11. An integrated circuit (IC) to operate a flyback converter, comprising:

a first switch, including a first terminal to couple with a primary winding of a transformer, a second terminal to couple with a first constant voltage node, and a first control terminal to receive a first switching control signal;

a second switch, including a first terminal to couple with a secondary winding of the transformer, a second terminal to couple with a second constant voltage node, and a second control terminal to receive a second switching control signal;

a first control circuit to provide the first switching control signal to turn on the first switch for a non-zero first time period in a converter cycle to allow current to flow in a first direction in the primary winding in response to a first switch voltage across the first switch transitioning below a first threshold; and a second control circuit to provide the second switching control signal to turn on the second switch for a non-zero second time period following the first time period in the converter cycle, the second control circuit operative to provide the second switching control signal to again turn on the second switch for a non-zero third time period in the converter cycle in response to a second switch voltage across the second switch transitioning below a second threshold to cause current flow in a second direction in the primary winding to at least partially discharge a capacitance of the first switch to cause the first switch voltage to transition below the first threshold to initiate a subsequent converter cycle and allowing the first switch to operate at or near a zero-voltage switching (ZVS) condition.

12. The IC of claim 11, wherein the second switch voltage undergoes resonant ringing including a series of peaks and troughs while the second switch is off; and wherein the second control circuit is operative to provide the second switching control signal to turn on the second switch for the third time period in response to the second switch voltage transitioning below the second threshold at or near a particular one of the troughs.

13. The IC of claim 12, wherein the second control circuit selects the particular one of the troughs at which to again turn on the second switch for the third time period at least partially according to a converter output signal.

14. The IC of claim 13, wherein the second control circuit selects the particular one of the troughs at which to again turn on the second switch for the third time period to selectively adjust a switching frequency and a duration of the converter cycle to at least partially regulate the converter output signal according to a setpoint signal.

15. The IC of claim 11, wherein the first control circuit selectively adjusts the first time period to regulate a converter output signal.

16. The IC of claim 11, comprising:

a third switch, including a first terminal coupled to receive an input voltage signal, a second terminal coupled with a first end of the primary winding, and a third control terminal to receive a third switching control signal;

a first diode, including a first anode connected to a second end of the primary winding, and a first cathode connected to the first terminal of the third switch; and a second diode, including a second anode connected to the first constant voltage node, and a second cathode connected to the first end of the primary winding;

wherein the first terminal of the first switch is coupled with the second end of the primary winding; and wherein the first control circuit is operative to provide the third switching control signal to turn on the third switch when the first switch is on, and to turn off the third switch when the first switch is off.

17. A method of operating a flyback converter having a first switch coupled with a primary winding of a converter transformer and a second switch coupled with a secondary winding of the converter transformer, the method comprising, in each of a series of converter cycles:

turning on the first switch for a non-zero first time period to allow current to flow in a first direction in the primary winding in response to a first switch voltage across the first switch transitioning below a first threshold;

turning off the first switch after the first time period;

turning on the second switch for a non-zero second time period after the first time period;

turning off the second switch after the second time period;

turning on the second switch again for a non-zero third time period in response to a second switch voltage across the second switch transitioning below a second threshold to cause current flow in a second direction in the primary winding to at least partially discharge a capacitance of the first switch to cause the first switch voltage to transition below the first threshold to initiate a subsequent converter cycle and allowing the first switch to operate at or near a zero-voltage switching (ZVS) condition.

18. The method of claim 17, wherein the second switch voltage undergoes resonant ringing including a series of peaks and troughs while the second switch is off; the method further comprising turning on the second switch for the third time period in response to the second switch voltage transitioning below the second threshold at or near a particular one of the troughs.

19. The method of claim 18, further comprising selecting the particular one of the troughs at which to again turn on the second switch for the third time period at least partially according to a converter output signal.

20. The method of claim 19, further comprising selecting the particular one of the troughs at which to again turn on the second switch for the third time period to selectively adjust a switching frequency and a duration of the converter cycle to at least partially regulate the converter output signal.

* * * * *